(12) United States Patent
Lyga et al.

(10) Patent No.: US 7,601,923 B2
(45) Date of Patent: Oct. 13, 2009

(54) PARALLEL PATH WEIGHT MEASUREMENT SYSTEM FOR SHEET HANDLING DEVICES

(75) Inventors: Thomas M. Lyga, Southbury, CT (US); Michael J. Ramadei, Trumbull, CT (US); Edilberto I. Salazar, Brookfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/948,193

(22) Filed: Nov. 30, 2007

(65) Prior Publication Data

US 2009/0139777 A1  Jun. 4, 2009

(51) Int. Cl.
G01G 19/40 (2006.01)
(52) U.S. Cl. .......................... 177/25.15; 177/145; 271/2; 198/447; 705/407
(58) Field of Classification Search ............... 177/25.15, 177/119, 145; 271/2, 303; 198/447; 705/407
See application file for complete search history.

(56) References Cited

U.S. PATENT DOCUMENTS

| | | | |
|---|---|---|---|
| 4,262,763 A | | 4/1981 | Raskin |
| 6,107,579 A | * | 8/2000 | Kinnemann ................. 177/145 |
| 6,286,831 B1 | * | 9/2001 | Marasco et al. ............. 271/303 |
| 6,460,844 B1 | * | 10/2002 | Clifford et al. ............. 271/9.13 |
| 6,940,025 B1 | | 9/2005 | Salomon |
| 2002/0166704 A1 | | 11/2002 | Miller et al. |

* cited by examiner

*Primary Examiner*—Randy W Gibson
(74) *Attorney, Agent, or Firm*—Brian A. Collins; Angelo N. Chaclas (57) ABSTRACT

A weighing system is provided to measure the article weight by first and second weight measurement devices. The first and second weight measurement devices each include a platform adapted to accept an article traveling along an upstream processing path and a device for sensing article weight as the article traverses the platform. Furthermore, the platforms of the first and second weight measurement devices define weight acquisition paths which are substantially parallel to one another. A diverter mechanism is provided to direct articles from the upstream processing path to one of the first or second weight acquisition paths. The diverter mechanism is controlled by a system processor which directs articles to one of the weight measurement devices depending upon its status, i.e., whether the path is available to receive another article for measuring weight. By diverting mailpieces to parallel weight acquisition paths, throughput is enhanced by multiple weight measurements occurring simultaneously.

15 Claims, 6 Drawing Sheets

PARALLEL PATH WEIGHT MEASUREMENT SYSTEM FOR SHEET HANDLING DEVICES

TECHNICAL FIELD

The present invention relates to systems for measuring weight, and, more particularly, to a new and useful system for measuring article weight to optimize the throughput efficiency of a sheet handling device.

BACKGROUND OF THE INVENTION

Various fabrication apparatus employ weigh stations for processing relatively thin sheet material. In the context used herein, sheet material may include mailing envelopes, sheets of paper or cardstock, web material, woven fabric, composite laminates, etc. One such apparatus is a mailing machine which processes mailing envelopes (i.e., a form of sheet material) to apply postage indicia based upon mailpiece weight.

Mailing machines perform a variety of operations including feeding, folding, inserting content material, sealing, weighing, and printing (i.e., printing the address information and postage indicia on the envelope). Generally, these steps are performed sequentially, i.e., serially, by various processing stations dedicated to the particular operation. Principle among these processing steps, are the weighing of the mailpiece and the printing of postage indicia based upon the mailpiece weight. That is, since the cost of mailing has historically been based upon the weight of the mailpiece, most conventional mailing machines will minimally include a weighing and printing station to perform these functions.

The efficiency of a mailing machine is typically measured by the number of mailpieces (i.e., those of a conventional size such as number ten [10] mailing envelopes) processed per unit time. For example, modern mailing machines are typically capable of processing at an upper rate of about two-hundred and sixty (260) mailpieces per minute, depending upon the complexity of the mailpiece job run. For example, if the weight of a mailpiece is known, the requirement to weigh the mailpiece can be eliminated, hence the mailpieces can be processed rapidly, e.g., at the maximum rate of about two hundred and sixty (260) mailpieces per minute. If, however, each mailpiece must be weighed, then processing occurs more slowly, e.g., at a substantially lower rate of about one hundred and thirty (130) mailpieces per minute.

The processing speed is also impacted by the required spacing between mailpieces and ability to move one mailpiece independent of another. With respect to the spacing between mailpieces, it will be appreciated that mailpieces spaced in twelve inch (12") increments will take longer to process than mailpieces spaced at six inch (6") increments. While it is desirable to minimize the spacing between envelopes, the spatial relationships and size requirements imposed by the various processing stations imposes significant design limitations which tend to increase the required spacing.

Figure 1:
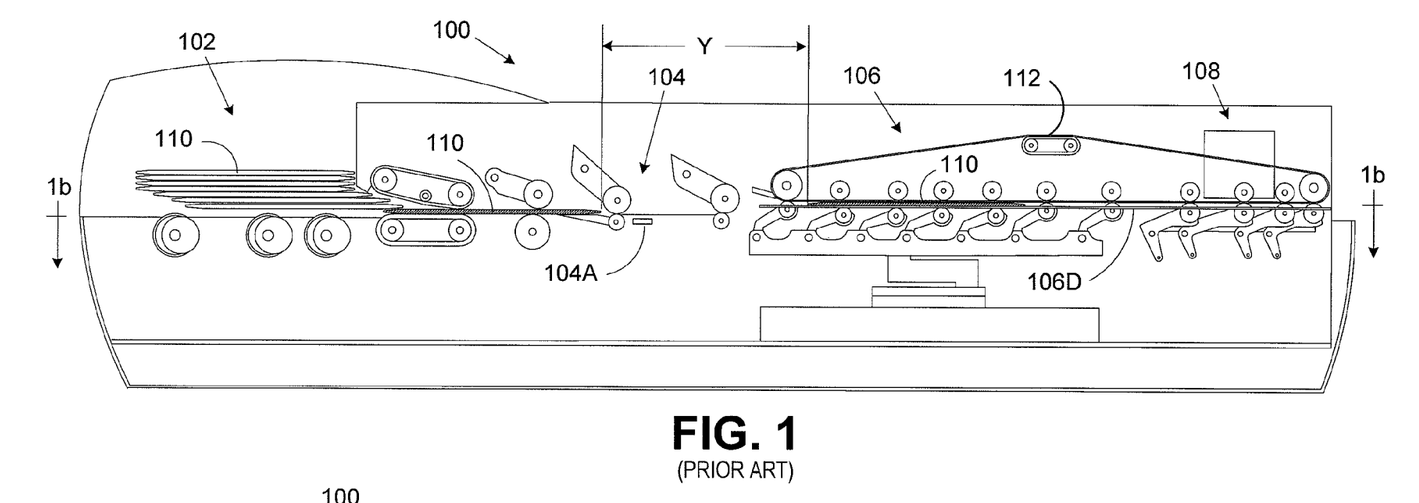
FIG. 1a is a partially broken-away and sectioned side view of a prior art mailing machine including a feeder, sealing, weighing, and printing station.
FIG. 1b is a top view of the prior art mailing machine for visually illustrating the spatial relationship between mailpieces and the impact of such spacing on throughput efficiency of the mailing machine.
Figure 1B:
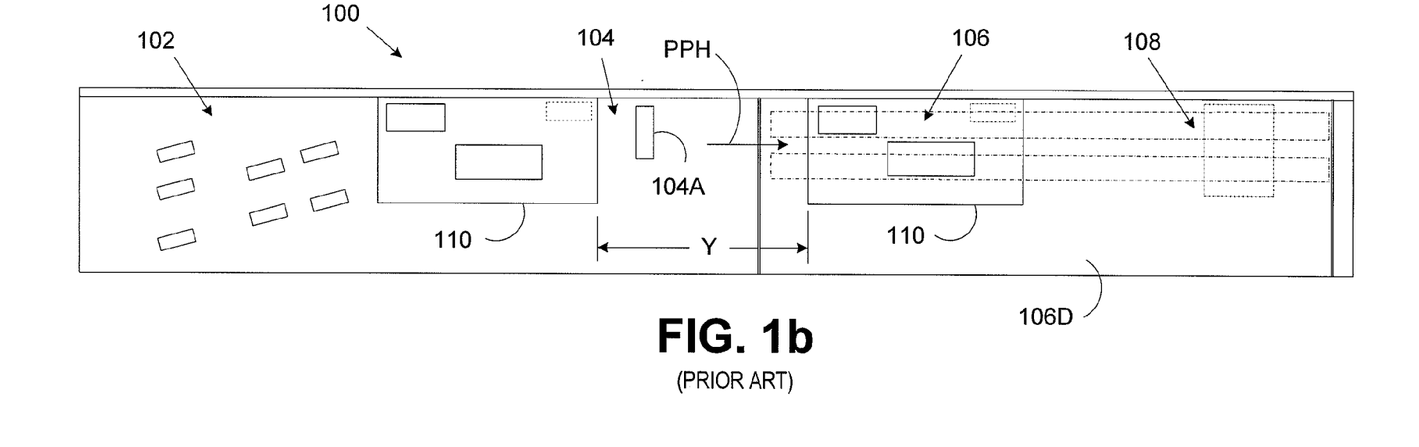

For example, in FIGS. 1a and 1b, profile and plan views, respectively, are shown of a prior art mailing machine 100, including a feeding station 102, a sealing station 104, a weighing station 106 and a printing station 108. The various stations 102, 104, 106, 108 are adapted to process mailpieces 110 ranging in size from (i) a post card size sheet (3.5 inches×5 inches), (ii) conventional No. 10-type envelopes for holding standard C- or Z-folded letter-size sheets of material, and (iii) even larger flats-type envelopes for containing standard unfolded sheet material. Consequently, the deck 106D of the weighing station 106 is configured to span a length sufficient to hold both envelope types.

Furthermore, certain stations, such as the sealing station 104, do not facilitate/permit the intermittent pausing of an envelope at any desired location but require that a mailpiece 110 be (i) positioned in advance of the station, i.e., in queue awaiting the processing of other downstream stations, or (ii) fully processed by the station. For example, it can be detrimental to the sealing operation for a moistening applicator or nozzle 104A (best seen in FIG. 1b) to sit idly upon the flap (not shown) of the mailpieces 110. Hence, the transport of mailpieces 110 along the processing path PPH must be controlled to await the completion of the weighing operation before initiating the sealing operation, i.e., at the sealing station 104.

Additionally, while it can be desirable to combine structural elements of a mailing machine to (i) perform dual functions and (ii) reduce the number of parts to assemble/maintain, these seemingly synergistic structural combinations can further limit processing throughput. This is especially true in connection with the use of conveyor belts and rollers to transport mailpieces 110 along the processing path PPH. For example, in FIG. 1a, a single upper belt 112 spans the decks 106D, 108D of the weighing and print stations 106, 108 to transport mailpieces 110 across both stations 106, 108. While the single belt 112 provides the motive force for transporting the mailpieces 110 across both stations 106, 108 (i.e., saving component, assembly and maintenance costs), the transport functions of both are integrally connected irrespective the processing speeds attainable by one or the other of the stations 106, 108. That is, an upstream mailpiece 110A cannot be weighed by the weigh station 106 until processing of the downstream mailpiece 110B is completed by the printing station 108, and vice versa.

Finally, it will be appreciated that, in addition to the deck 106D of the weighing station 106 spanning a length sufficient to accommodate various mailpiece configurations, the deck 106D also spans the length of the print station 108. As such, a single structural platform is fabricated/machined to decrease manufacturing costs. While this adaptation may enable closer mailpiece spacing, it has the effect of decreasing throughput by increasing the time required to weigh a mailpiece. More specifically, the time required to weigh a mailpiece 110 is a function of the "settling time", or the time required for the station deck 106D to dampen oscillations induced by the introduction of a mailpiece 110. That is, an accurate reading of weight can only be obtained when oscillations induced by the mailpiece 110 (i.e., each time a mailpiece is loaded and removed from the deck 110D) is damped below a threshold value (i.e., amplitude).

Inasmuch as the amplitude of weigh station oscillations is a function of the total mass of the spring/mass system (i.e., including, inter alia, the mailpiece 110, the deck 106D, rollers 106R and the upper belt 112), any additional or unnecessary mass will prolong the settling time, and, consequently, the time required to achieve an accurate weight measurement. Therefore, adaptations made to the weigh station 106 to incorporate a single elongated belt 112 or deck 106D can adversely impact the time to weigh a mailpiece 110, in addition to the processing throughput of the mailing machine 100.

A need, therefore, exists for a weight system or mailing machine having an improved weighing system or module which increases throughput without altering the operating speed or function of systems/modules upstream or downstream of the weighing module.

SUMMARY OF THE INVENTION

A weighing system is provided to measure the article weight by first and second weight measurement devices. The first and second weight measurement devices each include a platform adapted to accept an article traveling along an upstream processing path and a device for sensing article weight as the article traverses the platform. Furthermore, the platforms of the first and second weight measurement devices define weight acquisition paths which are substantially parallel to one another. A diverter mechanism is provided to direct articles from the upstream processing path to one of the first or second weight acquisition paths. The diverter mechanism is controlled by a system processor which directs articles to one of the weight measurement devices depending upon its status, i.e., whether the path is available to receive another article for measuring weight. By diverting mailpieces to parallel weight acquisition paths, throughput is enhanced by integrating/merging the processing schedules of two weight measurement devices.

BRIEF DESCRIPTION OF THE DRAWINGS

The accompanying drawings illustrate presently preferred embodiments of the invention, and, together with the general description given above and the detailed description given below, serve to explain the principles of the invention. As shown throughout the drawings, like reference numerals designate like or corresponding parts.

BEST MODE TO CARRY OUT THE INVENTION

The inventive weighing system and method for processing mailpieces is described in the context of a mailing machine such as a DM 800, DM 900 and DM 1000 Model Mailing Machines produced by Pitney Bowes Inc., located in Stamford, State of Connecticut, USA, though, the invention may be employed in any sheet handling apparatus, mailpiece inserter and/or postage apparatus wherein sheet material, whether mailpieces, paper, card stock, laminates, or building material, is Weighed-on-the-way® ("weigh-on-the-way" is a registered trademark of Pitney Bowes Inc., Stamford, Conn. USA) for further processing. The necessity to weigh the sheet material may be required to determine how the sheet material will be subsequently processed. For example, in a mailing machine, the weight of an envelope determines the value of the indicia printed for postage/delivery purposes. In other sheet handling equipment, the weight of an article may determine which cutting blades will be needed to cut/shear the sheet material or which processing path the material will follow, i.e., downstream of the weighing apparatus.

In the broadest sense of the invention, a weighing system provides multiple processing paths for optimizing the throughput efficiency of sheet handling devices. The weighing system includes first and second weight measurement devices defining substantially parallel weight acquisition paths. The weight measurement devices are operative to measure the weight of articles as they traverse each of the parallel weight acquisition paths. Furthermore, a diverter mechanism bifurcates an upstream processing path to direct the article to one OF the weight acquisition paths. The diverter mechanism may be pre-programmed or adapted to alternate the flow of sheet material mailpieces between an upper weight measurement device and a lower weight measurement device. In the described embodiment, however, a system processor controls the diverter mechanism such that articles are directed to one of the first and second weight measurement devices depending upon a readiness queue i.e., a status to receive another article for weight measurement.

Figure 2:
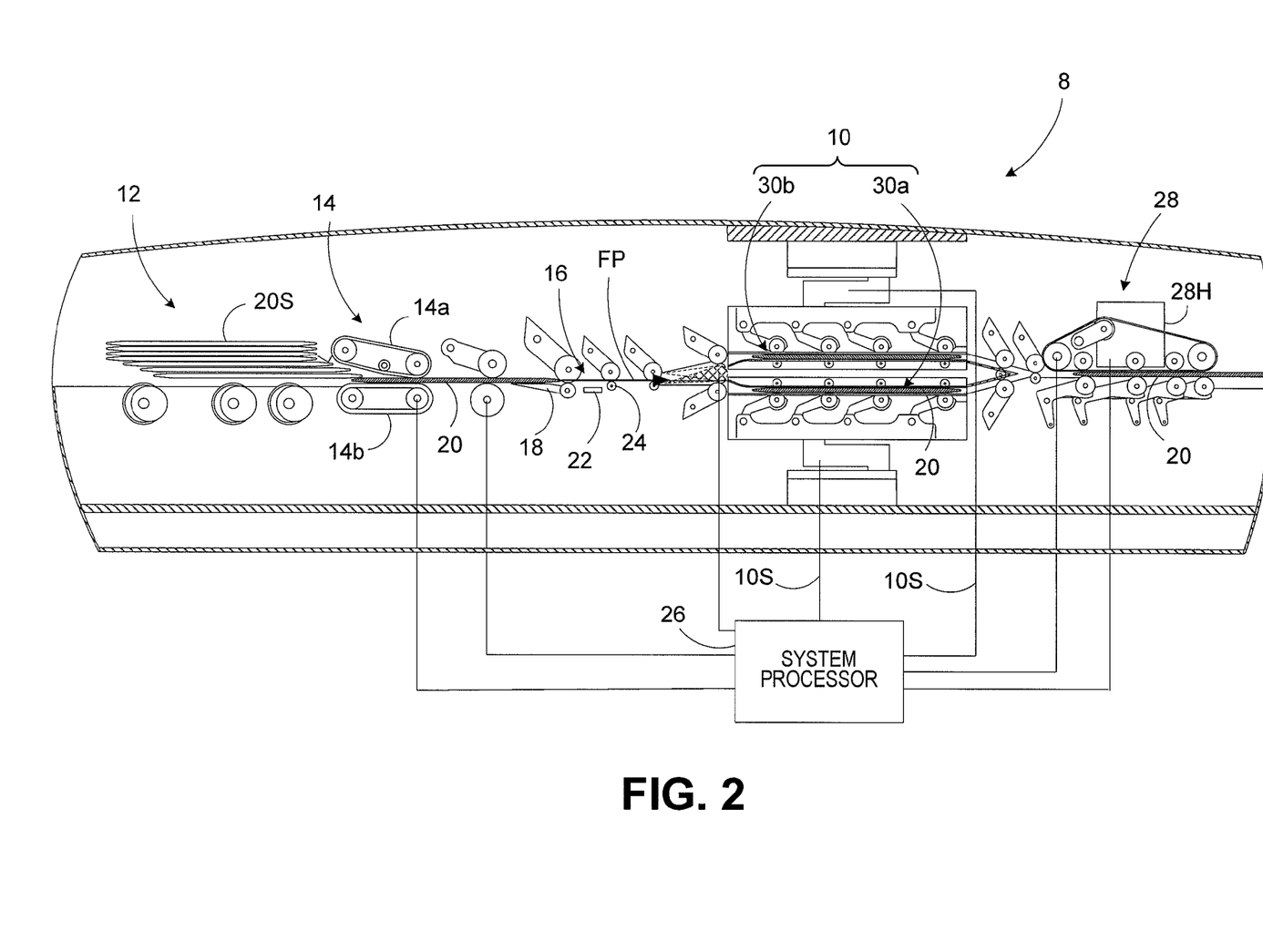
FIG. 2 is a partially broken-away and sectioned side view of a mailing machine including a weighing system according to the present invention.

In FIG. 2, a mailing machine 8 incorporates a weighing system 10 (sometimes referred to as a "weighing/weight module") according to the teachings of the present invention. Before discussing the weighing system 10 in greater detail, a brief description of the mailing machine 8, including its upstream and downstream elements, is provided. The mailing machine 8 includes a feeder assembly 12 having a singulator section 14 and a sealing module 16 for processing mailpieces 20 along a feed path FP. In the context used herein the "feed path" is any path along which the mailpieces 20 is directed for processing, whether the sheet material is supported on a smooth deck, via rollers, nips, or belts. However, for the purposes of this invention, the feed path FP should be viewed as having a plurality of sub-paths or segments. The various segments will be identified when discussing the operation of the mailing machine.

The singulator section 14, receives stacked mailpieces 20S and singulates/separates the lowermost mailpiece from the stack 20S. As the mailpieces 20 are driven along the processing path, the lowermost mailpieces 20 are shingled through a pair of belts 14a, 14b which, in cross section, define a shallow-V configuration. At the vertex formed by the belts 14a, 14b, a spring-biased interface between the belts 14a, 14b enables a single mailpiece 20 to pass or separate from the mailpiece stack 20S.

The singulated mailpiece 20 is then passed to the moistening/sealing module 16 wherein a blade 18 directs the underlying mailpiece flap (not shown) to a moistening applicator/nozzle 22 (depending upon the type of moistening/sealing module). As the flap of each mailpiece 20 passes the applicator or nozzle 22, an aqueous solution (including water and an anti-bacterial agent) moistens the flap sealant (also not shown) to activate the adhesive contained therein. Thereafter, the mailpiece 20 passes between a pair of closing nips 24 to seal the flap against the body of the mailpiece envelope. While the closing nips 24 are shown immediately following the moistening applicator 22, the closing nips may be disposed at any downstream location. Inasmuch as flap sealant is activated by a thin film of solution, i.e., as the mailpiece 20 passes the applicator/nozzle 22, it is generally undesirable for the flap to remain in contact with the applicator/nozzle 22 for more than the time necessary to apply the film. Hence, if mailpieces 20 must be momentarily paused to perform a particular operation, a system processor 26, which controls the various transport functions of the mailing machine 8, positions the mailpieces 20 immediately upstream or downstream of the applicator/nozzle 22. As such, idle contact of the flap sealant with the aqueous solution of the moistening/sealing module 16 is obviated.

The mailpieces 20 are then conveyed to the weighing system 10 for measuring delivery weight. That is, since the cost of delivery is typically based on mailpiece weight, the weighing system 10 functions to rapidly and accurately measure mailpiece weight as the mailpiece continues along the feed path FP. In the present invention, the mailpiece 20 is directed down one of two weight acquisition paths WP1, WP2. More specifically, the feed path FP for processing the mailpiece 20 travels along a first processing path FPU upstream of the weight measurement system/module 10, a second processing path FPD downstream of the weight measurement system/module and one of two parallel weight acquisition feed paths WP1, WP2. Irrespective the path taken, the weight measurement system 10 is operative to sense the weight of the mailpiece 20 as an article traverses the respective weight acquisition path WP1, WP2. Vibrations, produced by accelerating and decelerating the mailpiece across the weigh acquisition paths WP1, WP2 necessitate that the system 10 "settle-out" or achieve a threshold level of stability before generating or recording a weight measurement signal. The system processor 26 is responsive to a weight signal 10S and calculates the value of the indicia required for postage.

Thereafter, the mailpieces 20 are transported to the print station 28 where the mailpieces 20 are urged upwardly against a platen to ensure a planar surface for printing. Print heads 28H, extending through the platen, print the postage indicia on the envelope in addition to other symbology, e.g., one or two-dimensional barcodes, planet codes, or address information as may be required.

Figure 3:
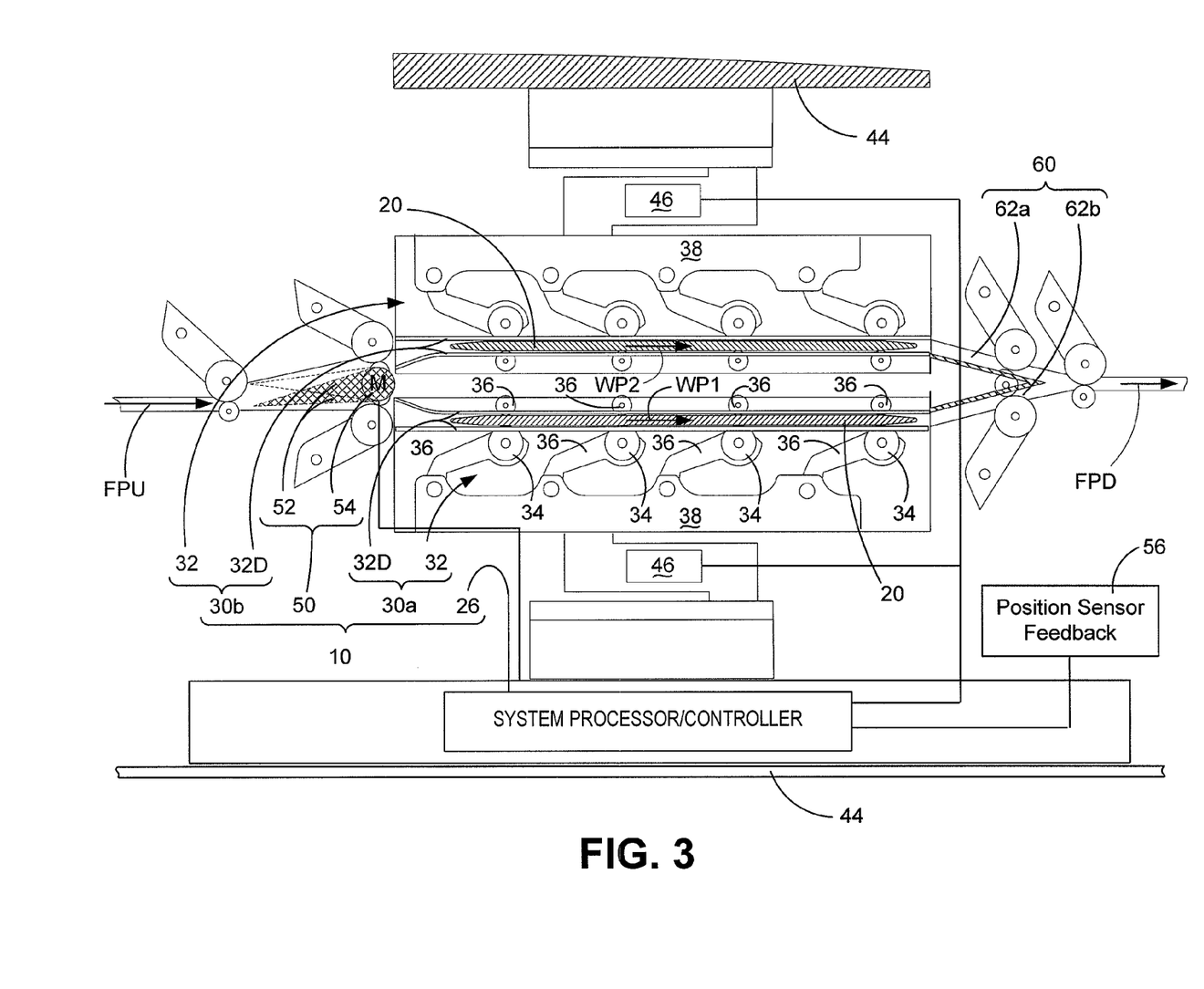
FIG. 3 is an enlarged view of the weighing system depicted in FIG. 2 including a pair of weighing platforms, a diverter mechanism for directing mailpieces to one of the pair of weighing platforms, and a system processor for calculating mailpiece weight and determining the postage required for delivery.

FIG. 3 depicts and enlarged profile view of the weighing system 10 according to the present invention. In the illustrated embodiment, the weight measurement system 10 comprises upper and lower weight measurement devices 30a, 30b which define one of the respective weight acquisition paths WP1, WP2. The weight measurement devices 30a, 30b may be structurally connected or structurally isolated, though, as will become apparent in the following discussion, the relative location and proximity must enable each to receive mailpieces 20 from the upstream processing path FPU and off-load/deliver mailpieces to a downstream processing path FPD.

The weight measurement device 30a includes a platform structure 32 having a substantially planar transport deck 32D for defining the weight acquisition path WP1. The deck 32D is mounted to support structure (not shown) surrounding a plurality of spring-biased nip rollers 34 which extend upwardly through slot-shaped openings in the deck 32D The rollers 34 are supported by arms 36 which are pivotally mounted to a connecting base 38. The base 38 is mounted to and supported by a structure/system 40 capable of measuring deflections due to weight. For example, a load cell may be interposed between the connecting base 38 and a stationary structural housing 44 of the mailing machine 8. Alternatively, or additionally, a cantilever spring 46 may be affixed at each end to the base 38 and the housing 44 while a strain gage 48 may be disposed on the face or surface of the cantilever spring 46.

Similar to the upstream elements, a plurality of drive nip rollers 48 are disposed in opposing relationship to the spring biased nip rollers 34. The drive nip rollers 48 are controlled by the processor 26 in a conventional manner to convey the mailpieces 20 across the platform 32D. Mailpieces conveyed along each of the weight acquisition paths WP1, WP2 are decelerated, held on the platform 32D for a settling period, and accelerated once again for delivery to the print station 28 (see FIG. 2). Inasmuch as these motions induce vibrations, each of the platforms 32D must await a "settling period" to ensure that an accurate weight measurement signal may be obtained and calculated by the system processor 26. As vibratory oscillations dampen to a threshold level, the deflection of the connecting base can be measured by the load cell or a strain gage (whichever weight measurement sensor is employed) and interpreted by the system processor 26.

Figure 4A:
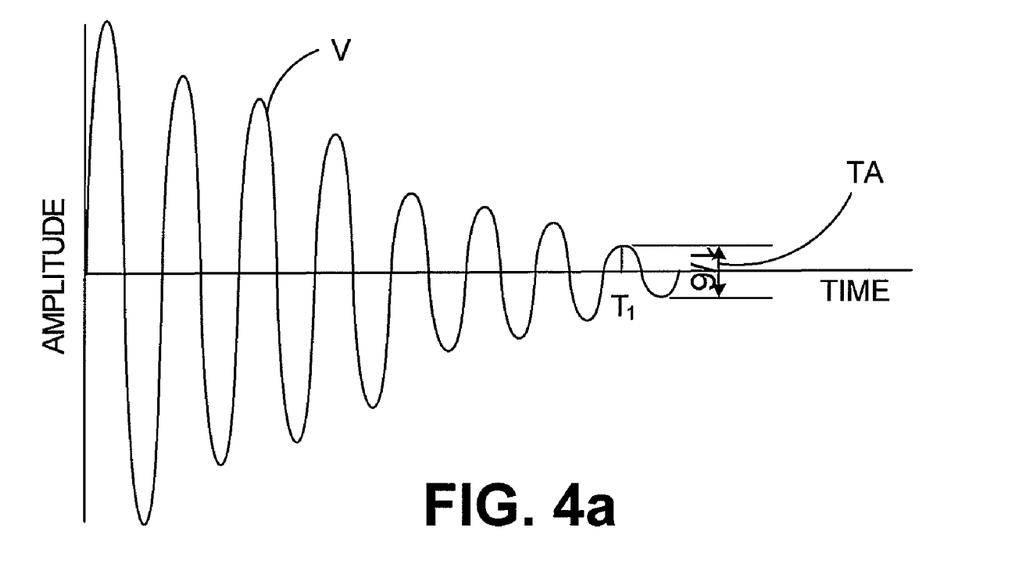
FIG. 4a is a graph of the platform vibrations as they decay over the settling period.
Figure 4B:
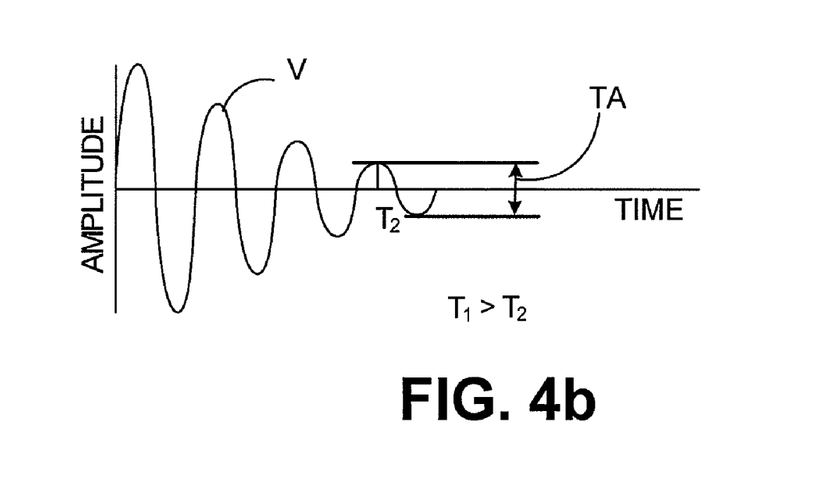
FIG. 4b is a graph of the platform vibrations as they decay over the settling period for a mailing machine employing the weighing system and teaxhings of the present invention.

FIG. 4a is a graph of the platform vibrations V as they decay over the settling period $T_1$. When the platform vibrations V are damped to a threshold level TA, the processor 26 records the weight signal 10S issued by the strain gage 46 and converts the signal 10S into a weight measurement. Inasmuch as the settling period T1 can adversely influence the throughput efficiency of a mailing machine, the weighing system 10 of the present invention mitigates the impact of the settling period T1 by the dual paths WP1, WP2 produced by the weight measurement devices 30a, 30b. These advantages will be described in greater detail when discussing the operation and function of the inventive weighing system 10.

The platforms 32D of the upper and lower weight measurement devices 30a, 30b are substantially parallel, though the spring-biased rollers 34 can enable a degree of skewing/compliance to accommodate variations in thickness from one mailpiece to another. While the described embodiment shows the platforms 32D in a vertically tiered arrangement, i.e., due to the spatial arrangement of the upper and lower weight measurement devices 30a, 30b, it should be appreciated that the platforms 32d and weight measurement devices 30a, 30b may be juxtaposed in a horizontal side-by-side arrangement while still providing the advantages of the present invention. Hence, the platforms 32D may be co-planar, or juxtaposed, provided that the weight acquisition paths WP1, WP2 remain substantially parallel for mailpiece processing.

In FIGS. 2 and 3, mailpieces 20 are fed to the mailing machine 8 for the application of postage indicia. More specifically, mailpieces 20 are conveyed along the upstream processing path FPU, across one of the weight acquisition paths WP1, WP2 and merged, once again, along the downstream path to the print station 28. After being sealed at the moistening/sealing module 16, a diverter mechanism 50 bifurcates and diverts the flow of mailpieces 20 from the upstream processing path FPU to one of the first or second weight acquisition paths WP1, WP2. The diverter mechanism 50 comprises a diverter flap 52 and a means 54 for alternately positioning the flap 52 to one of at least two operating positions (shown in solid and dashed lines in FIG. 3). A first operating position directs mailpieces 20 to one of the weight measurement devices 30a, 30b while the other operating position directs mailpieces 20 to the other of the weight measurement devices 30a, 30b.

In the described embodiment, a simple rotary actuator M is directly connected to the axis of the diverter flap 52 and controlled by the system processor 26 to impart rotational motion to the flap 52. More specifically, system processor 26 is provided with position feedback signals 56 from multiple locations along the various processing paths FPU, WP1, WP2, FPD. Such position feedback signals 56 are commonly provided by an array of optical sensors (not shown) e.g., photocells, which detect when a mailpiece 20 passes over and, consequently, diminishes the light sensed by each optical sensor. By monitoring the pattern of light between the trailing edge of one mailpiece and the leading edge of another, the position of every mailpiece 20 traveling along the feed path FP can be accurately determined and monitored. Consequently, the diverter mechanism 50 can be operated by the system processor 26 based upon a readiness queue provided by the weighing system 10. That is, when a mailpiece 20 has been weighed by one of the weight measurement devices 30a, 30b and moved away from the respective platform 32D, a readiness queue is provided to the processor 26 to energize the actuator 54 and position the diverter flap 52.

Upon reaching the respective platform 32D, the mailpiece 20 is decelerated to essentially a stop condition and vibration levels V are monitored to until the threshold level TA is achieved (shown by the settling period T1 of FIG. 4). The mailpiece 20 is then weighed by the system processor 26 to calculate the value of postage indicia which will be required to subsequently deliver the mailpiece 20. Following the step of weight measurement, each of the mailpieces 20 are then returned to a common or integrated processing path downstream of the weighing system 10. More specifically, each of the platforms 302D is coupled to V- or Y-shaped adaptor 60 which directs mailpieces 20 along one of two converging segments 62a, 62b. At the apex of the segments 62a, 62b, the mailpieces 20 are merged into the downstream processing path FPD.

Figure 5:
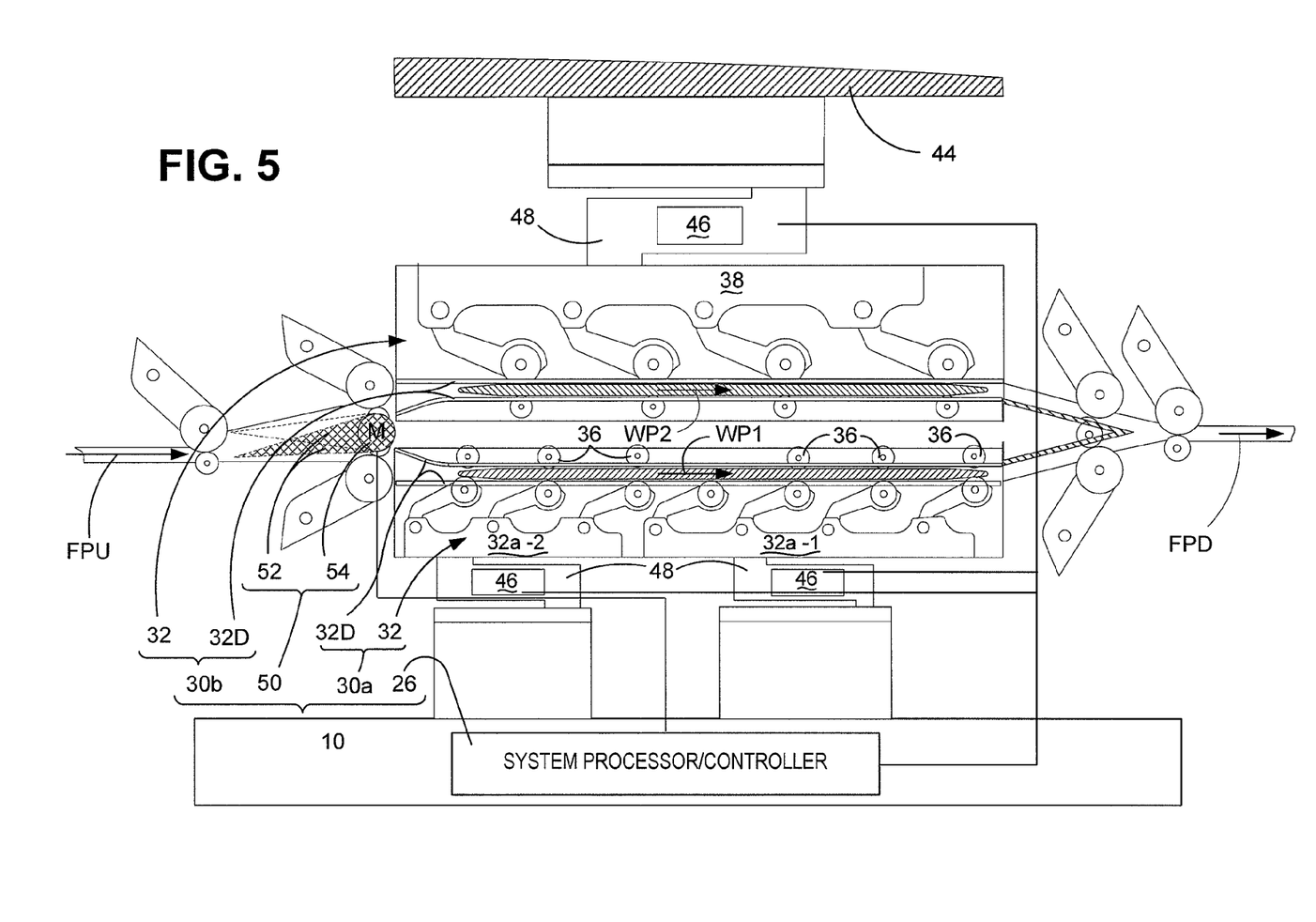
FIG. 5 is a alternative embodiment of the present invention wherein at least one of the weight measurement device includes primary and secondary scale segments.

An alternate embodiment of the present invention is shown in FIG. 5 wherein at least one of the weight measurement devices 30a, 30b includes primary and secondary scale segments 30a-1, 30a-2. In this embodiment, the weighing system 10 employs only one of the weight measurement devices 30a or 30b to weigh mailpieces 20 having different dimensions. For example, in a first operating mode, a mailpiece 20 of a first dimension may be weighed on the primary scale segment 30a-1 while another mailpiece, of the same dimension, may be staged on the secondary scale segment 30a-2, immediately upstream of the first scale segment 30a-1. In this way, the spacing between mailpieces 20 may remain small to optimize throughput efficiency. Should the mail run require mailpieces 20 of a second dimension, e.g., a length dimension larger than the first, both primary and secondary scale segments 30a-1, 30a-2 may be employed to measure the weight of the large mailpiece 20. That is, the primary and secondary scale segments 30a-1, 30a-2 will cooperate to acquire a weight measurement as the mailpiece 20 spans both scale segments 30a-1, 30a-2. Accordingly, mailpieces 20 of varying length dimension can be weighed without sacrificing the throughput efficiency of the weighing system 10. A more detailed description of a two-part scale, such as the type described above, may be found in co-pending, commonly-owned, U.S. patent application Ser. No. 11/824,670 entitled "Multi-Segment Weight Measurement Apparatus and Method for Processing Sheet Material", which is hereby incorporated by reference in its entirety.

In summary, the weighing system of the present invention increases the throughput efficiency of a sheet handling device. The weighing system provides this improvement without altering the operating speed or function of systems/modules upstream or downstream of the weighing module. In the context of a mailing machine 8, throughput is enhanced by processing multiple mailpieces over a reduced processing period or cycle. This improvement is pictorially depicted in FIGS. 6a and 6b wherein FIG. 6a illustrates the processing of two mailpieces using a prior art or conventional weighing system, and FIG. 6b depicts the processing of the same two mailpieces using the weighing system of the present invention.

Figure 6A:
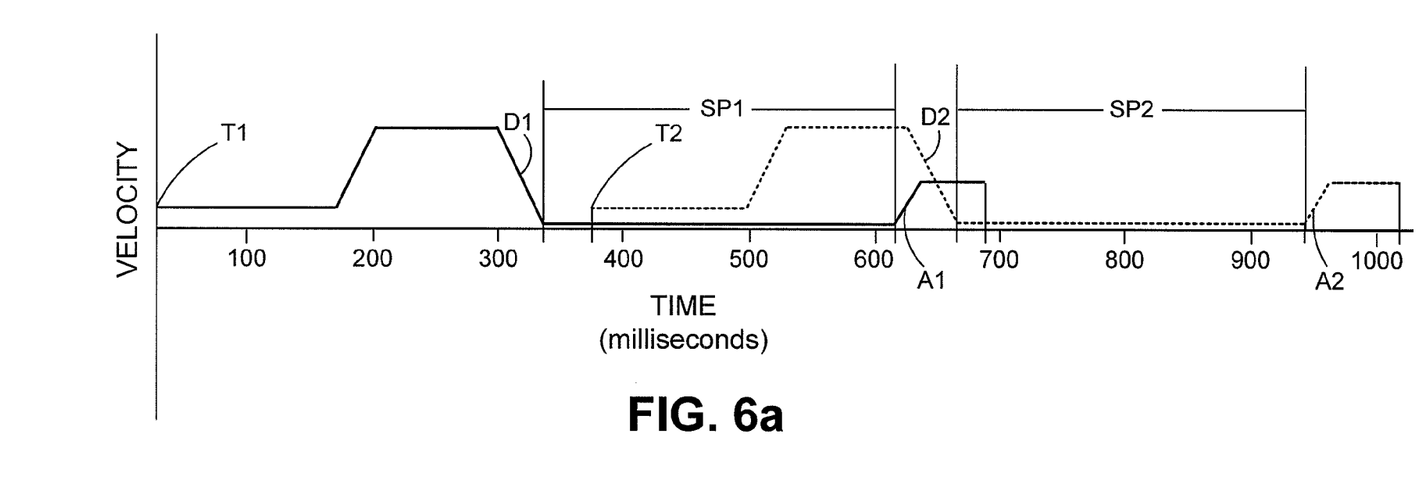
FIG. 6a is the velocity profile of two mailpieces are plotted vs. the time traviled along the feed path of the mailing machine.

In FIG. 6a, the velocity profile of two mailpieces 110 are plotted vs. the time traveled along the feed path of the mailing machine 100 (see FIG. 1a). A first mailpiece initiates processing at time T1 and a second mailpiece initiates processing at time T2. The spacing between mailpieces 110 (established by staggering the processing times T1, T2) must be sufficiently large to avoid interference or collision of mailpieces 110 downstream, i.e., when being weighed by the weight measurement device. More specifically, the first mailpiece 110 decelerates along segment D1 of the velocity profile, comes to rest for a period SP1 on the platform while being weighed, and is accelerated along segment A1 upon being conveyed downstream to the print station. Similarly, the second mailpiece 110 decelerates along segment D2, comes to rest for a period SP2 on the platform, and is accelerated downstream along segment A2. To avoid interference on the platform, i.e., during the respective settling periods, SP1, SP2, the mailpieces 110 are staggered in time and, as a consequence, the total processing time for both mailpieces exceeds one-thousand milliseconds (1000 ms).

Figure 6B:
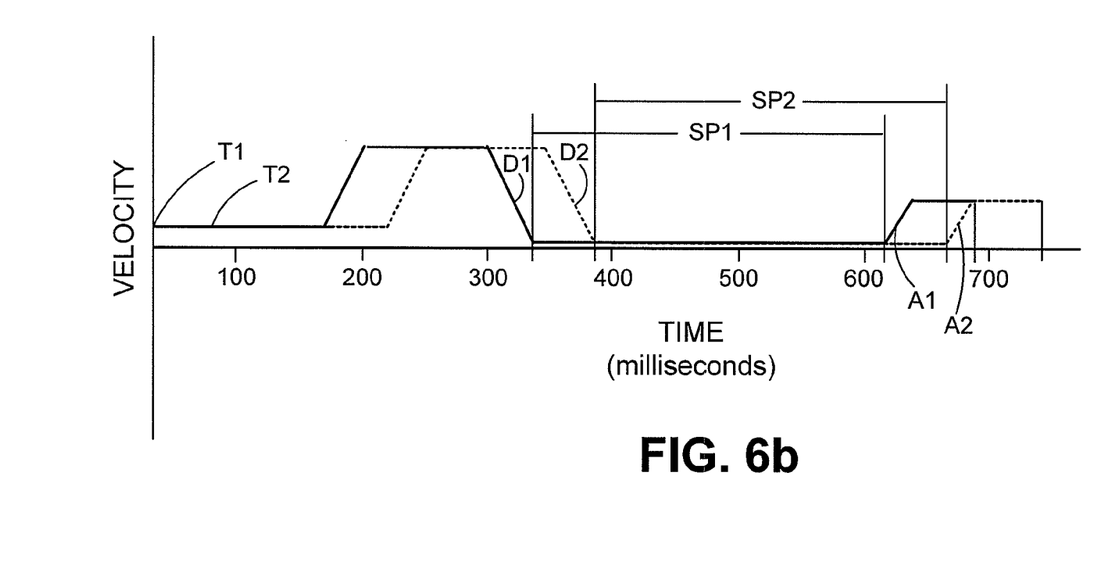
FIG. 6b is the velocity profile of two mailpieces are similarly plotted for a mailing machine employing the weighing system and teachings of the present invention.

In FIG. 6b, the velocity profile of two mailpieces 20 are similarly plotted for a mailing machine 8 employing the weighing system 10 and teachings of the present invention. A first mailpiece 20 initiates processing at time T1 and a second mailpiece initiates processing at time T2. The first mailpiece 20 decelerates along segment D1 of the velocity profile, comes to rest for a period SP1 on one of the platforms 32D associated with one of the weight measurement devices 30a, is weighed and is accelerated along segment A1 for conveyance downstream to the print station. The second mailpiece 20 decelerates along segment D2, comes to rest for a period SP2 on the other platform 32D associated with the other weight measurement device 30b, and is accelerated downstream along segment A2. Inasmuch as the diverter mechanism 50 bifurcates the upstream processing path, interference between mailpieces may be avoided. Furthermore, the mailpieces 20 need only be separated by a distance sufficient to allow the diverter mechanism 50 to change operating positions. Consequently, the total time for both mailpieces 20 to be processed is reduced to about seven-hundred and forty milliseconds (740 ms).

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

The invention claimed is:

1. A weighing system to measure the weight of articles; comprising:
    a first weight measurement device including a first platform adapted to accept an article traveling along an upstream processing path and defining a first weight acquisition path;

second weight measurement device including a second platform adapted to accept an article traveling along the upstream processing path and defining a second weight acquisition path; the first and second weight acquisition paths being arranged in parallel with respect to each other;

each of the first and second weight measurement devices, furthermore, adapted to convey the articles across the first and second platforms and including a means for sensing weight as an article traverses the respective weight acquisition path; and, a diverter mechanism operative to divert articles from the upstream processing path to one of the first or second weight acquisition paths wherein one of the weight measurement devices is disposed vertically above the other of the weight measurement devices such that one weight acquisition path is disposed vertically above the other weight acquisition path and wherein one of the weight measurement devices is segmented into a primary and second scale segment, the primary scale segment operative to measure the weight of an article of a first dimension, and the primary and secondary scale segments operative to cooperatively measure the weight of an article of a second dimension, the second dimension being larger than the first dimension.

2. The weighing system according to claim 1 wherein the diverter mechanism includes a diverter flap and a means for alternately positioning the flap to various operating positions, one of the operating positions directing articles to one of the weight measurement devices and the other of the operating positions directing articles to the other of the weight measurement devices.

3. The weighing system according to claim 1 further including a system processor for controlling the diverter mechanism such that articles are directed to one of the first and second weight measurement devices depending upon a readiness queue to receive another article for measurement.

4. The weighing system according to claim 1 wherein each of the first and second weight measurement devices include a means for returning the weighed article to an integrated downstream processing path.

5. The weighing system according to claim 1 wherein the first weight measurement device is structurally isolated from the second weight measurement device.

6. The weighing system according to claim 1 wherein each of the first and second weight measurement devices include a load cell disposed in combination with the respective platform, a load cell of one weight measurement device being loaded in tension to measure article weight, and the load cell of the other weight measurement device being loaded in compression to measure article weight.

7. The weighing system according to claim 1 wherein the articles fed along the processing paths are mailpieces.

8. The weighing system according to claim 6 wherein each load cell includes a spring means for supporting the respective platform and a means for measuring the spring displacement against a force imposed thereon by the article weight.

9. A method for processing mailpieces on a mailing machine, comprising the steps of:
conveying each mailpiece along an upstream processing path;
disposing the first weight measurement device vertically above the second weight measurement device such that one weight acquisition path is disposed vertically above the other weight acquisition path;
segmenting one of the weight measurement devices into a primary and second scale segment, each defining a portion of the weight platform;
alternately diverting mailpieces from the principle processing path to a first and second weight measurement device, the first weight measurement device including a first platform defining a first weight acquisition path and the second weight measurement device including a second platform defining a second weight acquisition path; the first weight acquisition path being substantially parallel to the second weight acquisition path;
conveying each mailpiece across the first and second platforms of the weight measurement devices; and,
weighing the mailpieces conveyed along the first and second weight acquisition paths including the steps of:
measuring the weight of a mailpiece of a first dimension on the weight platform of the primary scale segment; and,
measuring the weight of a mailpiece of a second dimension, larger than the first dimension, on the combined weight platforms of both the primary and secondary scale segments.

10. The method according to claim 9 further including the step of:
merging the weighed mailpieces into an integrated downstream processing path.

11. The method according to claim 9 further including the step of structurally isolating the first weight measurement device from the second weight measurement device.

12. The method according to claim 9 further comprising the step of printing a postage indicia on each of the mailpieces based on the measured article weight.

13. A weighing module for measuring the weight of mailpieces in a mailing machine, comprising:
first and second weight measurement devices defining substantially parallel weight acquisition paths which are adapted to receive mailpieces from an upstream processing path; the first and second weight measurement devices operative to alternately convey mailpieces across each of the weight acquisition paths and sense the weight of the mailpiece upon traversing the respective weight acquisition path, and one of the weight measurement devices being disposed vertically above the other of the weight measurement devices such that one weight acquisition path is disposed vertically above the other weight acquisition path;

a diverter mechanism operative to bifurcate the upstream processing path to one of the weight acquisition paths;

an integration assembly operative to merge weighed mailpieces into a downstream processing path; and, a system processor for controlling the diverter mechanism such that articles are directed to one of the weight measurement devices depending upon a readiness queue to receive another article for weight measurement wherein one of the weight measurement devices is segmented into a primary and second scale segment, the primary scale segment being operative to measure the weight of an article of a first dimension, and the primary and secondary scale segments operative to cooperatively measure the weight of an article of a second dimension, the second dimension being larger than the first dimension.

14. The weighing module according to claim 13 further comprising:

a sensing device for determining whether a mailpiece has traversed a threshold location within each of the weight acquisition paths, the sensing device issuing the readiness queue indicative that one of the weight measurement devices is ready to receive another article for weight measurement.

15. The weighing module according to claim 13 wherein the first weight measurement device is structurally isolated from the second weight measurement device.

* * * * *